G. S. GOODSPEED.

Improvement in Brushes and Mixers for Stove Blacking.

No. 123,099.              Patented Jan. 30, 1872.

WITNESSES.             INVENTOR.

123,099

UNITED STATES PATENT OFFICE.

GURDON S. GOODSPEED, OF PROVIDENCE, RHODE ISLAND.

IMPROVEMENT IN BRUSHES AND MIXERS FOR STOVE-BLACKING.

Specification forming part of Letters Patent No. 123,099, dated January 30, 1872.

*To all whom it may concern:*

Be it known that I, GURDON S. GOODSPEED, of the city and county of Providence, in the State of Rhode Island, have invented a new and Improved Brush and Mixer for Stove-Blacking, of which the following is a specification:

In the accompanying drawing like letters indicate like parts.

Figure 1:
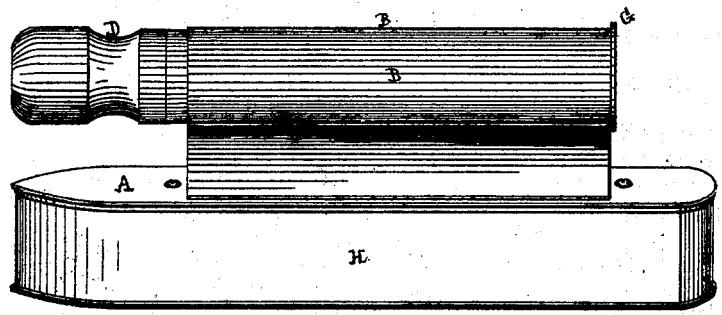
Figure 2:
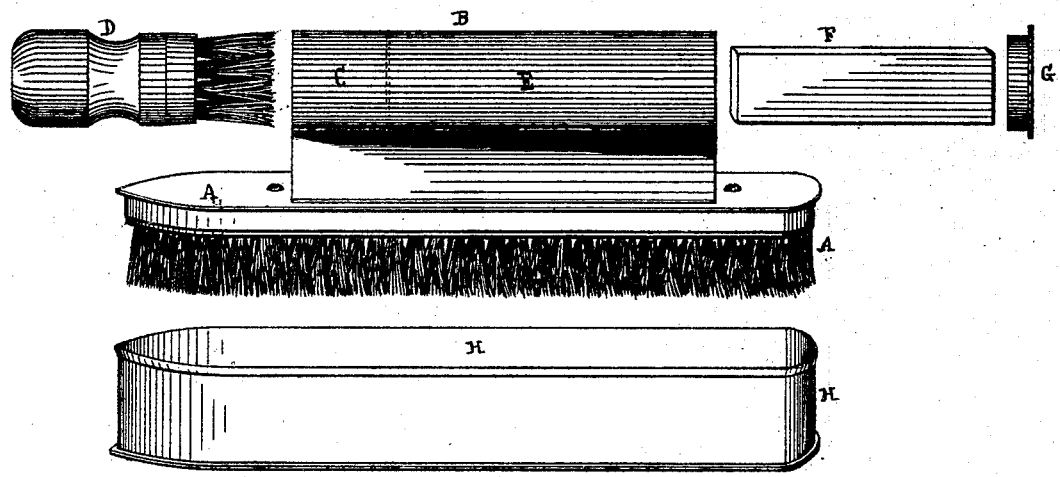

Figure 1 is a perspective view of my improved brush and mixer. Fig. 2 shows the several parts of the same when disconnected.

The parts of my said invention are as follows: A polishing-brush, A, provided with a cylindrical handle, B, properly mounted upon the back of the brush, as shown in the drawing. In the handle B, at its opposite ends, are two receptacles. In the receptacle C is inserted a small mixing-brush, D, the handle of which fits into and closes the aperture. The receptacle E serves to hold the roll of stove-polish F, and is closed by the lid or cover G. The whole combination, thus far described, is used like and serves for a cover or lid to the mixing-dish H, which is best made to conform to the shape and size of the polishing-brush A, which it incloses and protects. The handle B, with its several parts, and the mixing-dish H, are made of metal or any suitable material.

When not in use, the whole is compactly combined, as shown in Fig. 1. When taken apart and ready for use the mixing-brush D is a convenient means for compounding the polishing materials in the mixing-dish H, from which the blacking is readily taken upon the polishing-brush A, as required.

I claim as my invention and desire to secure by Letters Patent—

The combination of the polishing-brush A, the handle B, with its receptacles C and E and cover G, the mixing-brush D, and the brush-holder and mixing-dish H, all made and used substantially in the manner and for the purposes specified.

GURDON S. GOODSPEED.

Witnesses:
 WILLIAM B. COREY,
 WARREN R. PERCE.